(12) United States Patent
Billups, Jr.

(10) Patent No.: US 10,960,532 B2
(45) Date of Patent: Mar. 30, 2021

(54) SOCKET-LOCK-IT

(71) Applicant: William Lawrence Billups, Jr., Glen Allen, VA (US)

(72) Inventor: William Lawrence Billups, Jr., Glen Allen, VA (US)

( * ) Notice: Subject to any disclaimer, the term of this patent is extended or adjusted under 35 U.S.C. 154(b) by 11 days.

(21) Appl. No.: 16/602,273

(22) Filed: Sep. 5, 2019

(65) Prior Publication Data

US 2020/0070332 A1 Mar. 5, 2020

Related U.S. Application Data

(63) Continuation-in-part of application No. 16/179,687, filed on Nov. 2, 2018, now Pat. No. 10,493,616, which is a continuation-in-part of application No. 15/046,754, filed on Feb. 18, 2016, now Pat. No. 10,118,287.

(60) Provisional application No. 62/176,412, filed on Feb. 19, 2015, provisional application No. 62/765,364, filed on Sep. 5, 2018.

(51) Int. Cl.
| | |
|---|---|
| B25H 3/00 | (2006.01) |
| B25G 1/04 | (2006.01) |
| H01F 7/02 | (2006.01) |
| G01C 9/32 | (2006.01) |

(52) U.S. Cl.
CPC .............. *B25H 3/003* (2013.01); *B25G 1/04* (2013.01); *G01C 9/32* (2013.01); *H01F 7/02* (2013.01)

(58) Field of Classification Search
CPC ...... A47F 5/0846; A47F 7/0028; B25B 13/06; B25B 13/56; B25H 3/00; B25H 3/003; B25H 3/04; B25H 3/06

USPC ........ 211/69, 69.5, 69.6, 70.6; 206/372, 378
See application file for complete search history.

(56) References Cited

U.S. PATENT DOCUMENTS

| | | | | |
|---|---|---|---|---|
| 5,228,570 | A * | 7/1993 | Robinson | B25H 3/06 206/375 |
| 5,398,823 | A * | 3/1995 | Anders | B25H 3/003 206/378 |
| 5,467,874 | A * | 11/1995 | Whitaker | B25B 23/0035 206/378 |
| 5,715,951 | A * | 2/1998 | Dembicks | B25B 13/56 206/378 |
| 6,386,363 | B1 * | 5/2002 | Huang | B25H 3/003 206/1.5 |
| 6,431,373 | B1 * | 8/2002 | Blick | B25H 3/003 206/378 |
| 6,991,105 | B2 * | 1/2006 | Winnard | B25H 3/003 206/378 |
| 7,152,747 | B2 * | 12/2006 | Wang | A47F 5/0006 211/70.6 |

(Continued)

*Primary Examiner* — Joshua E Rodden

(57) ABSTRACT

A socket holder with a built in locking mechanism that is user controlled and activated by a push button which controls internal locking mechanisms which allow this socket holder to securely store and transport sockets mounted to a main socket holder body. This socket holder can hold multiples of sockets to the main socket holder body, releasing them only when desired by the user with the push of the push button that controls the internal mechanisms which release the sockets from the main socket holder body. This socket holder is designed to organize and securely lock the sockets onto the main socket holder body in a way that is dependable and easy to use.

33 Claims, 14 Drawing Sheets

(56) References Cited

U.S. PATENT DOCUMENTS

| | | | | |
|---|---|---|---|---|
| 8,556,075 B1* | 10/2013 | Ou | ................... | B65D 73/0064 |
| | | | | 206/378 |
| 2005/0221664 A1* | 10/2005 | Winnard | ............... | B25H 3/003 |
| | | | | 439/510 |
| 2010/0065520 A1* | 3/2010 | Hsieh | .................. | B25H 3/06 |
| | | | | 211/70.6 |
| 2011/0089126 A1* | 4/2011 | Hsieh | .................. | B25H 3/06 |
| | | | | 211/70.6 |
| 2012/0061339 A1* | 3/2012 | Chang | ................. | B25H 3/003 |
| | | | | 211/70.6 |
| 2014/0260826 A1* | 9/2014 | Eggert | ............... | B25B 23/0035 |
| | | | | 81/124.6 |
| 2016/0096264 A1* | 4/2016 | Kao | .................. | B25H 3/003 |
| | | | | 206/378 |

* cited by examiner

SOCKET-LOCK-IT

CROSS REFERENCE TO RELATED APPLICATIONS

This application also claims benefit of provisional application 62/765,364 filed on Sep. 5, 2018. The current application is a continuation in part of application Ser. No. 16/179,687, filed Nov. 2, 2018, now U.S. Pat. No. 10,493,616, which is also a continuation in part of application Ser. No. 15/046,754, filed Feb. 18, 2016, now U.S. Pat. No. 10,118,287, which also claims priority to provisional application No. 62/176,412, filed Feb. 19, 2015.

STATEMENT REGARDING FEDERALLY SPONSORED RESEARCH OR DEVELOPMENT (IF APPLICABLE)

"Not Applicable"

REFERENCE TO SEQUENCE LISTING, A TABLE, OR A COMPUTER PROGRAM LISTING COMPACT DISC APPENDIX (IF APPLICABLE)

"Not Applicable"

BACKGROUND OF THE INVENTION

The field of endeavor being discussed relates to tools and equipment that use "sockets" such as mechanics sockets in automobile repairs, aircraft and machinery. Even more particular to the actual "holders of these sockets".

The "socket holder" being very important as these sockets come in a multiple of different sizes and a multiple of different connecting drive sizes. This makes the need for a reliable holder with this new locking mechanism a feature and a necessity that has not been previously there for the user and the lack of it not being there the cause of much frustration, confusion and wasted time looking for these many different sockets while working on jobs requiring use of these sockets.

With many different size sockets with their different drive sizes not being kept in decent order with a secure and reliable way has been the reason for much confusion and wasted time. (Example) ¼" ⅜" ½" ¾" 1" and above drive sizes for sockets, with each size drive of a socket having many working size ends that go onto each set. This is why it is very important to have a secure, easy to use socket holder with designated spaces for each socket on a lockable socket storage holder device.

Again the background of the invention comes from the need of: NOT having a strong and secure way to easily lock mount and dismount tool sockets onto a socket holder in a reliable, easy to use kind of way for use and transport of said sockets.

In the past the previous way of carrying these tool sockets for many people was to just put them in a box or a bag, making these sockets very hard to access easily and quickly, and causing great frustration for many when looking for said sockets when they were needed on any particular job where a socket or a multiple of different size sockets was needed.

For the most part it seemed the only time a set of sockets was in order and easy to find was when they just came in the box or in the shipping container from the manufacturer of these said sockets.

Using this secure and lockable socket holder device will maintain these sockets in their organized holding spaces on the socket holder dependably.

Keeping these different size drive and sized sockets sockets in their respective holder spaces securely and dependably according to their ascending or descending size order will enable quick and easy access to them when they needed.

BRIEF SUMMARY OF THE INVENTION

The invention claimed is named as the Socket-Lock-It and it is a socket holder designed to securely hold and transport a multiple amount of various sized sockets with various sized drives on its main socket holder body, which can be made or formed out of any hard resin or suitable desired material such as steel, brass, aluminum etc.

The main feature of the Socket-Lock-It socket holder being an ability to hold sockets onto a main socket holder body, while various internal parts work together to create strong and reliable socket holding internal locking mechanisms on each of its individual socket holder mountings, with each socket holder mounting space having its owri exposed or recessed push button control button controlling hold or release functions to the sockets which are mounted on the main socket holders body, holding sockets securely while allowing easy mount and dismount of these sockets as individual socket holder push buttons control each of the socket holder mounting spaces, only to release sockets when the user presses the desired location socket holder mounting push bunion.

Sockets will always be organized and ready for work when they are needed with this dependable and easy to use Socket-Lock-It socket holder.

Figure 1:
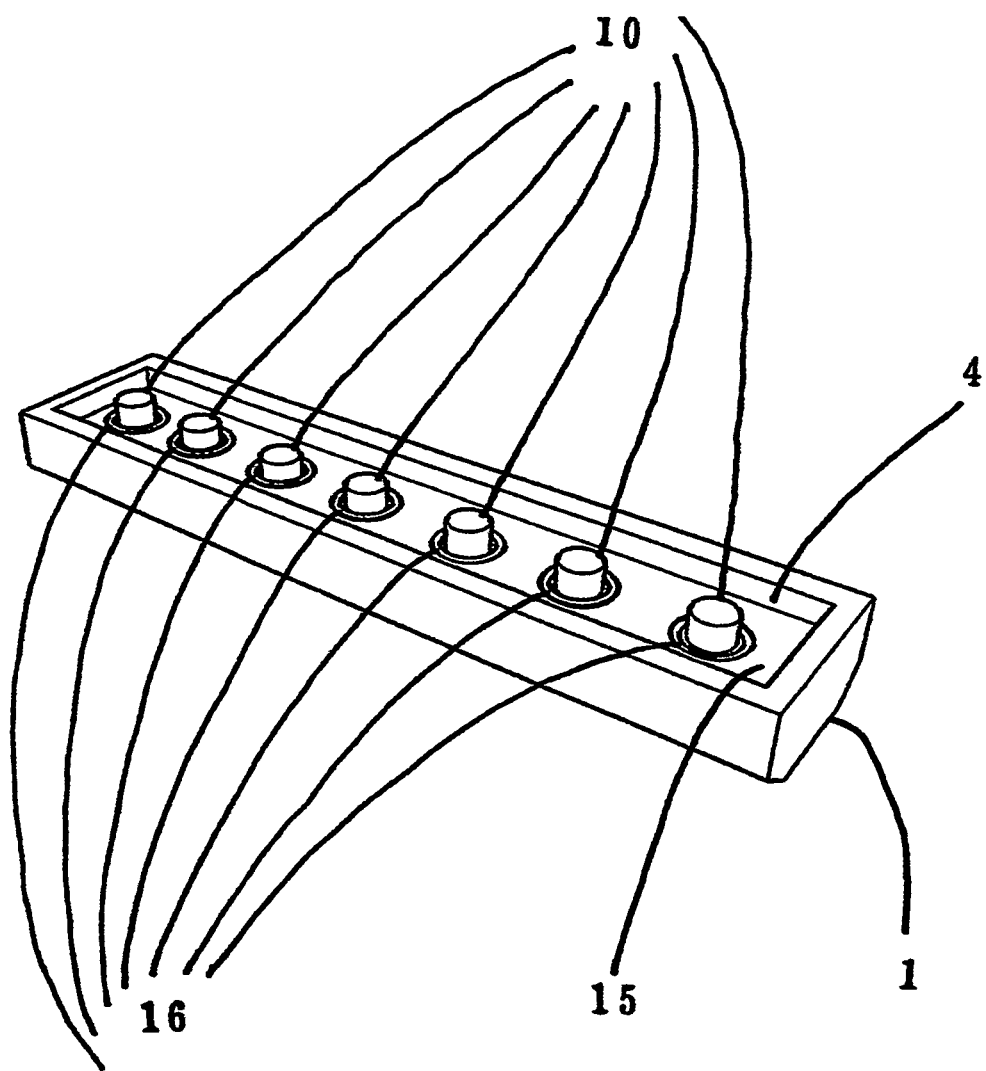
FIG. 1 Is a backside view of the main socket holder body (1) showing where the push button end of push rods (10) are protruding thru an exposed button back plate (15) placed in a cutout on main body for mounting exposed or recessed back plate (4) where the push button end of push rods are also going thru back plate holes (16) on the exposed button back plate (15).
Figure 2:
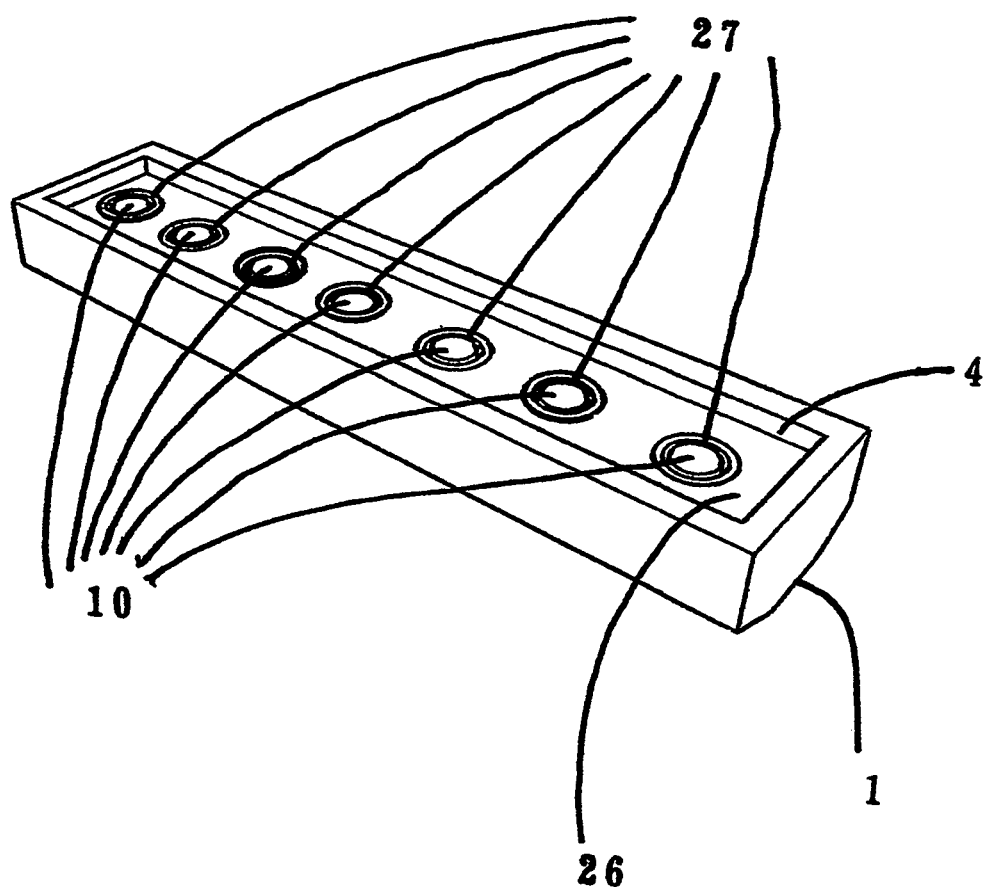
FIG. 2 Is a backside view of the main socket holder body (1) showing where the push button end of push rods (10) are protruding thru a recessed push button back plate (26) placed in a cutout on main body for mounting exposed or recessed back plate (4) where the push button end of push rods are seen resting in the recessed push button cutouts on recessed push button back plate (27).
Figure 3:
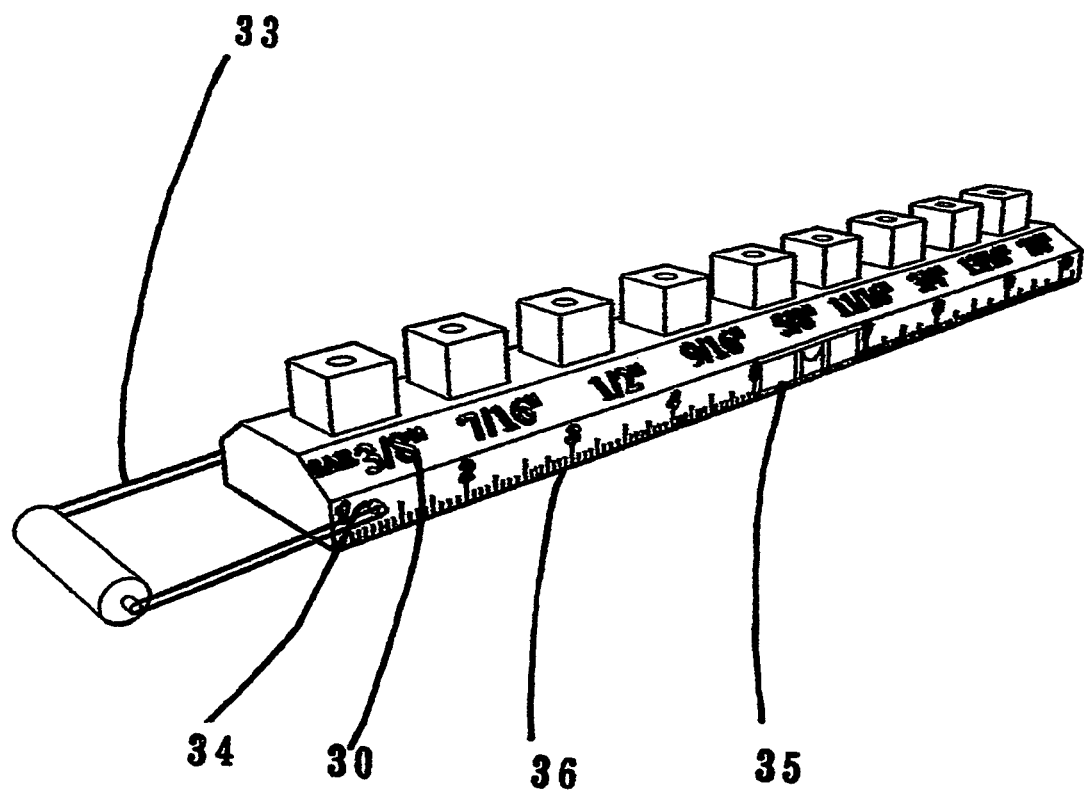
FIG. 3 Shows a handle (33) with handle mounting holes on main socket holder body (34) socket size markings of sae or metric (30) measurement scale with rulings in inches and metric (36) and a bubble level (35).
Figure 4:
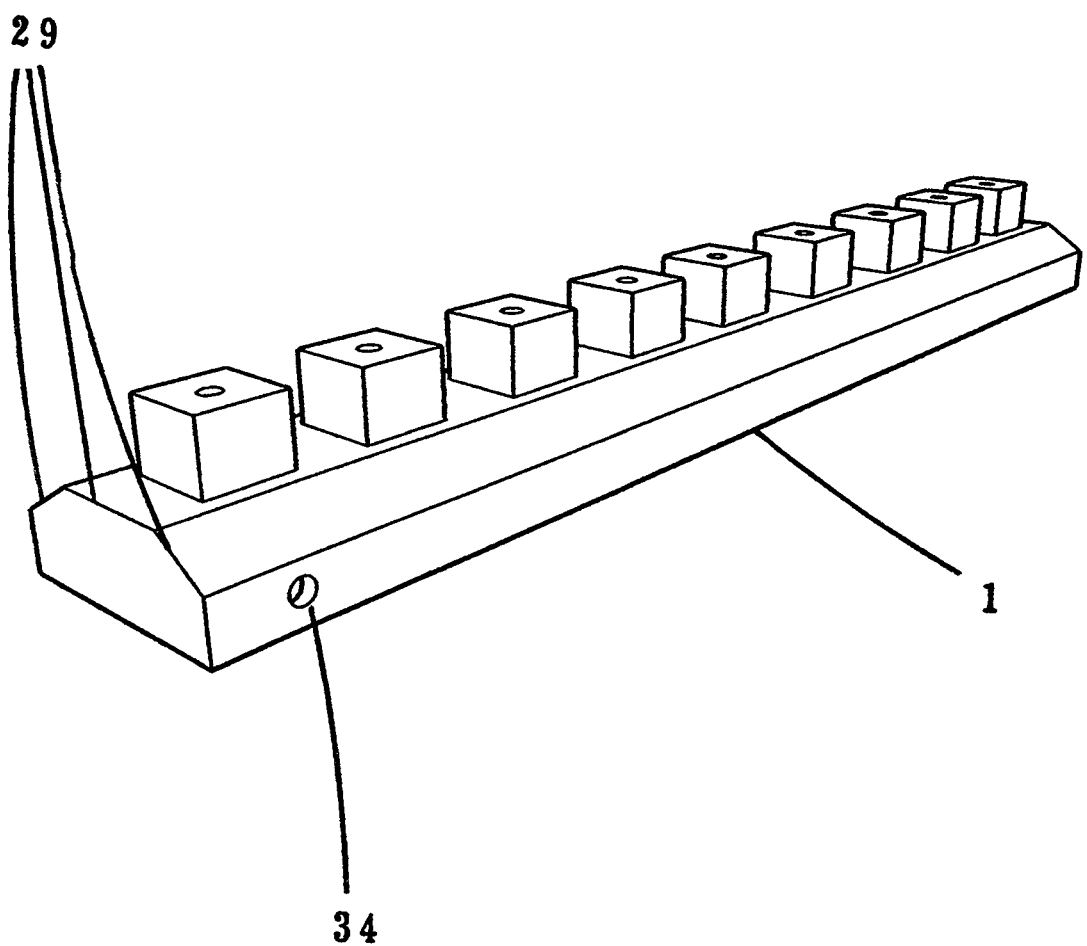
FIG. 4 Shows a main socket holder body (1) with a handle mounting hole on main socket holder body (34) and a plurality of angles on main socket holder body (29).
Figure 5:
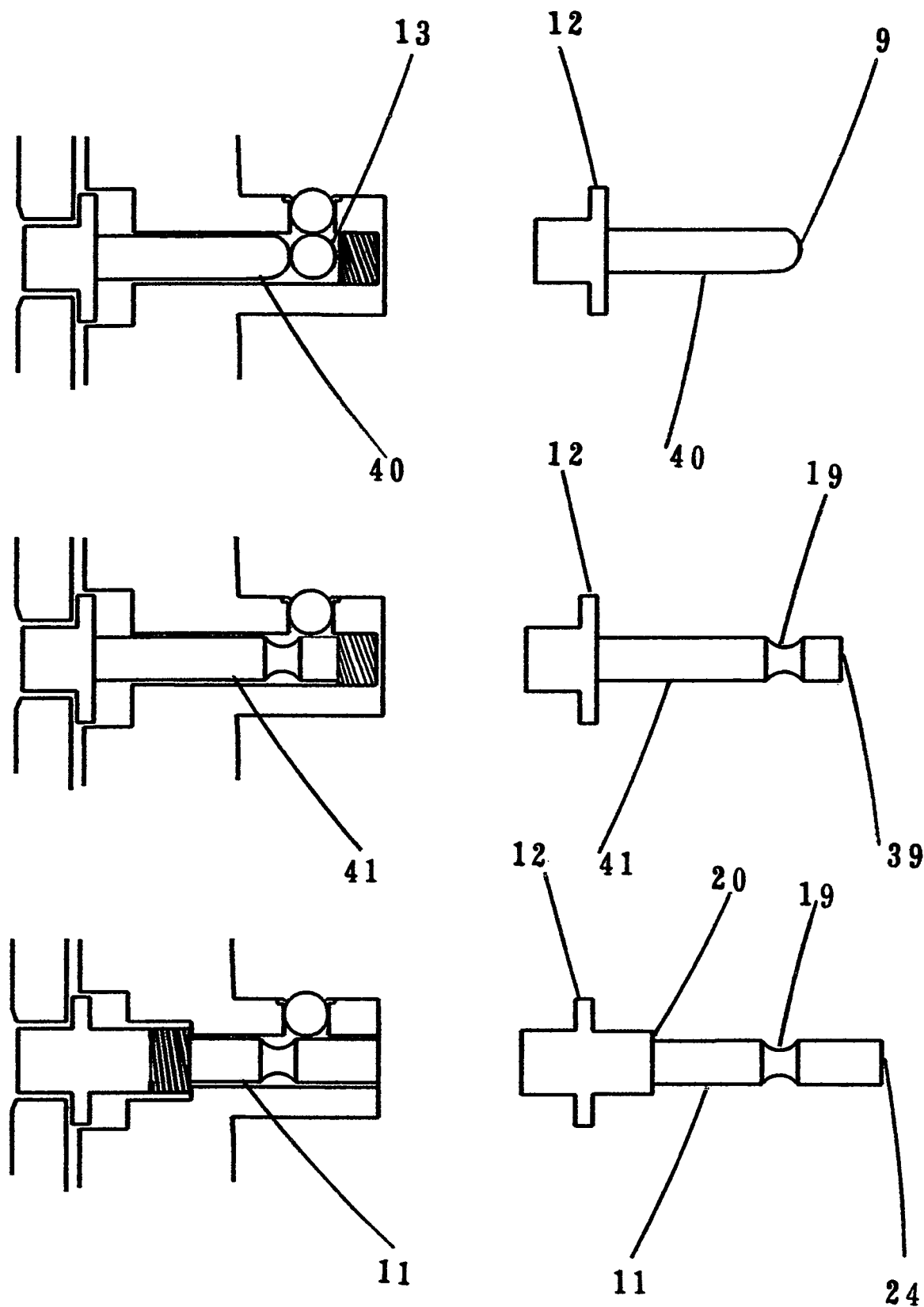
FIG. 5 Shows internal cutaway views of the main socket holder body (1) along with the socket holder mounting (2) showing 3 types of push rods installed into the main socket holder body (1) while also showing the 3 types of push rods by themselves individually also, each push rod being displayed from top of the page to the bottom of the page, starting with the push rod type 1 (40) then the push rod type 2 (41) then the push rod type 3 (11) showing differences and similarities of the 3 types of push rods along with showing even greater details in the following figures of FIG. 6 FIG. 7 FIG. 8.
Figure 6:
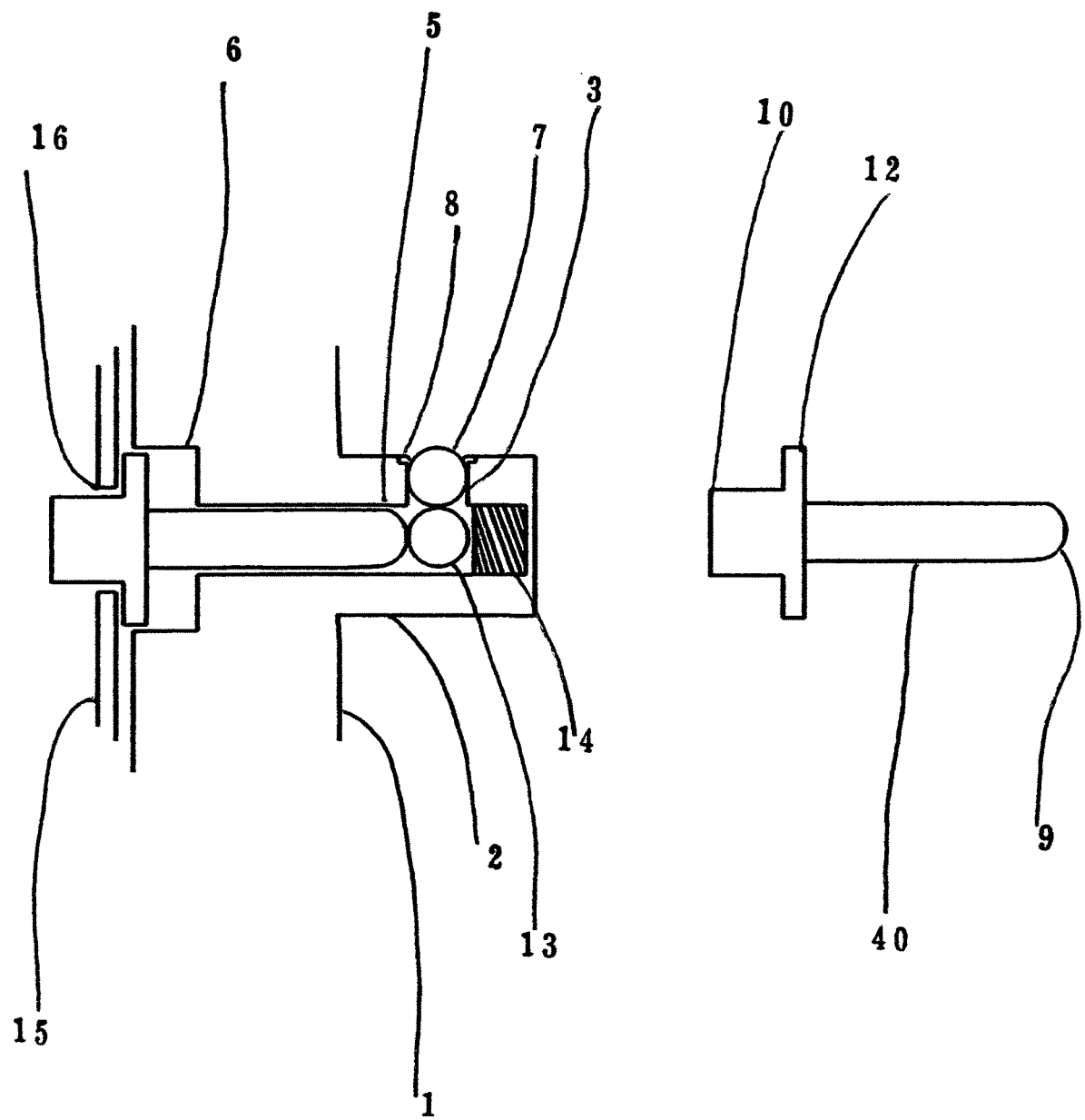
FIG. 6 Shows a push rod type 1 (40) with an internal split view of the main socket holder body (1) along with the socket holder mounting (2) showing how parts meet and interact internally.
Figure 7:
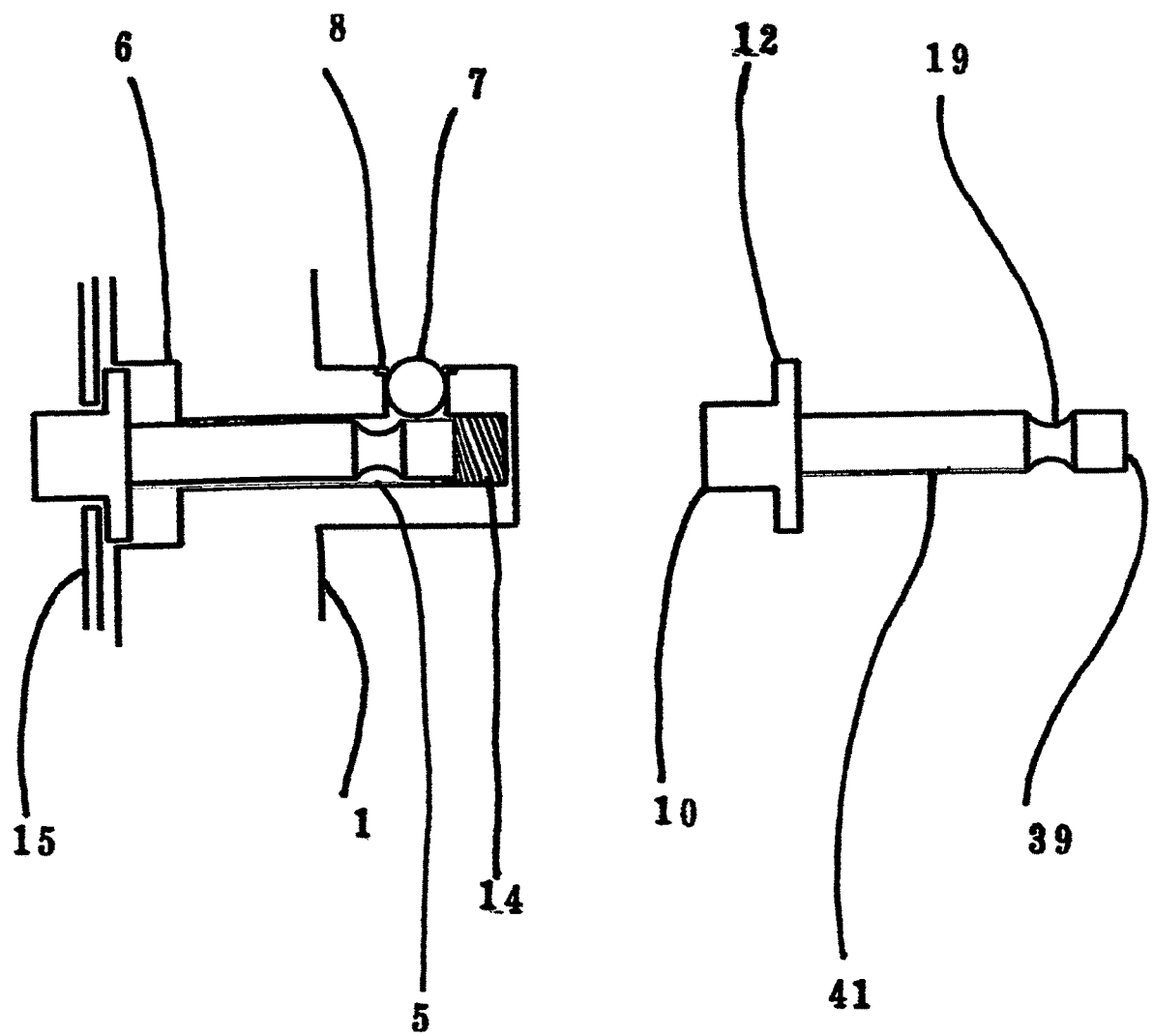
FIG. 7 Shows a push rod type 2 (41) with an internal split view of the main socket holder body (1) along with the socket holder mounting (2) showing how parts meet and interact internally.
Figure 8:
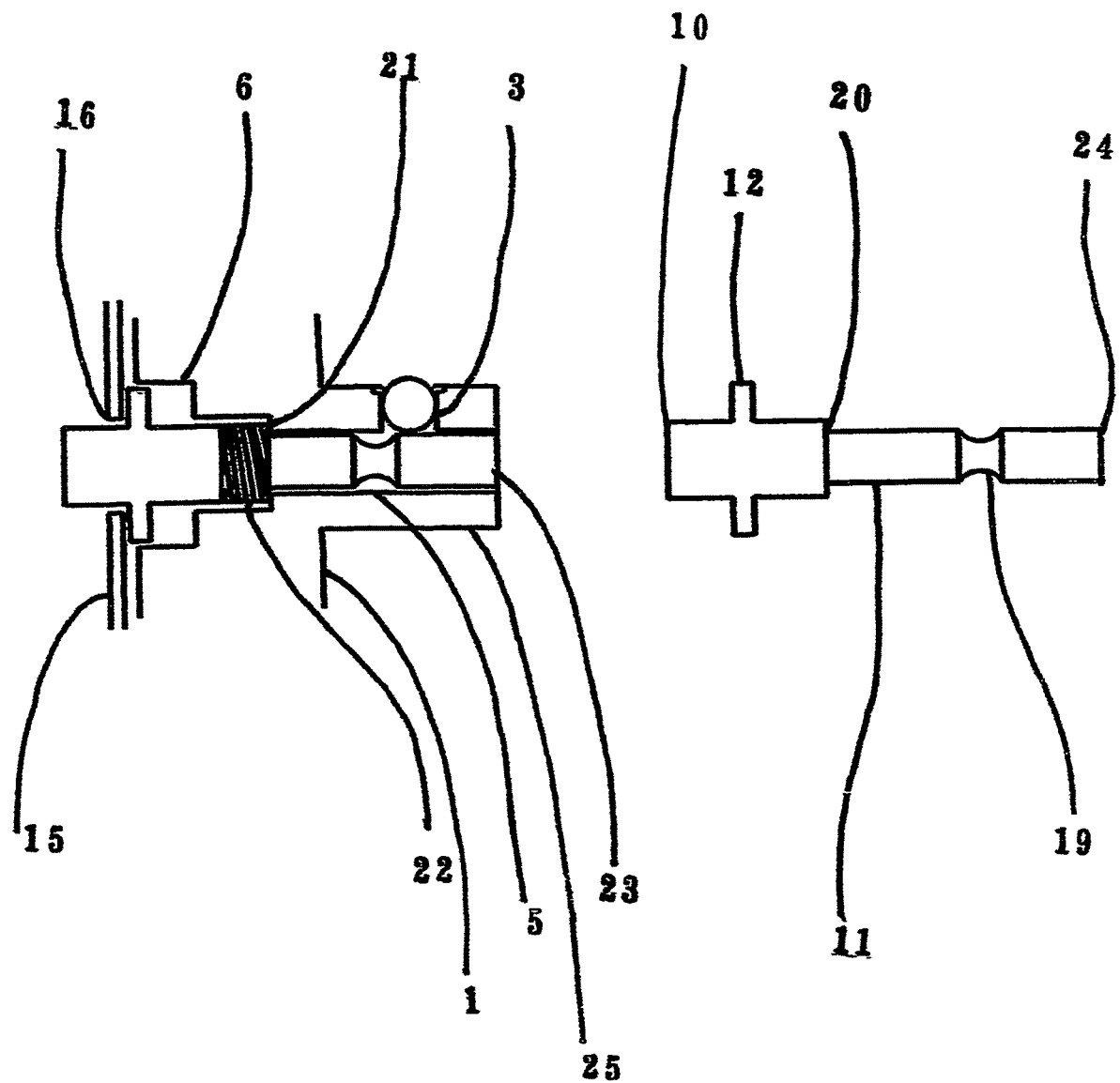
FIG. 8 Shows a push rod type 3 (11) with an internal split view of the main socket holder body (1) along with the socket holder mounting (2) showing how parts meet and interact internally.
Figure 9:
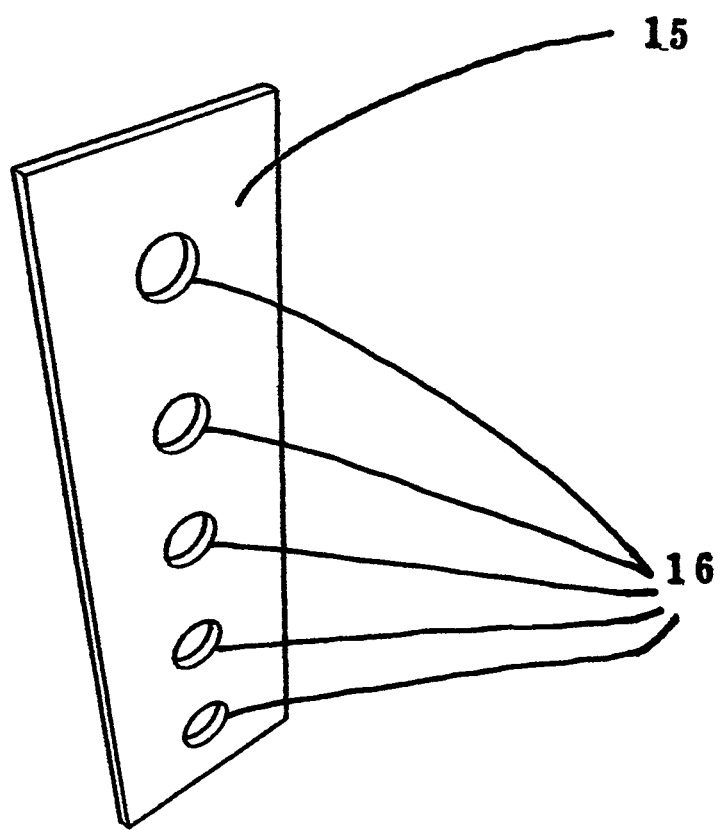
FIG. 9 Shows an exposed button back plate (15) with back plate holes.
Figure 10:
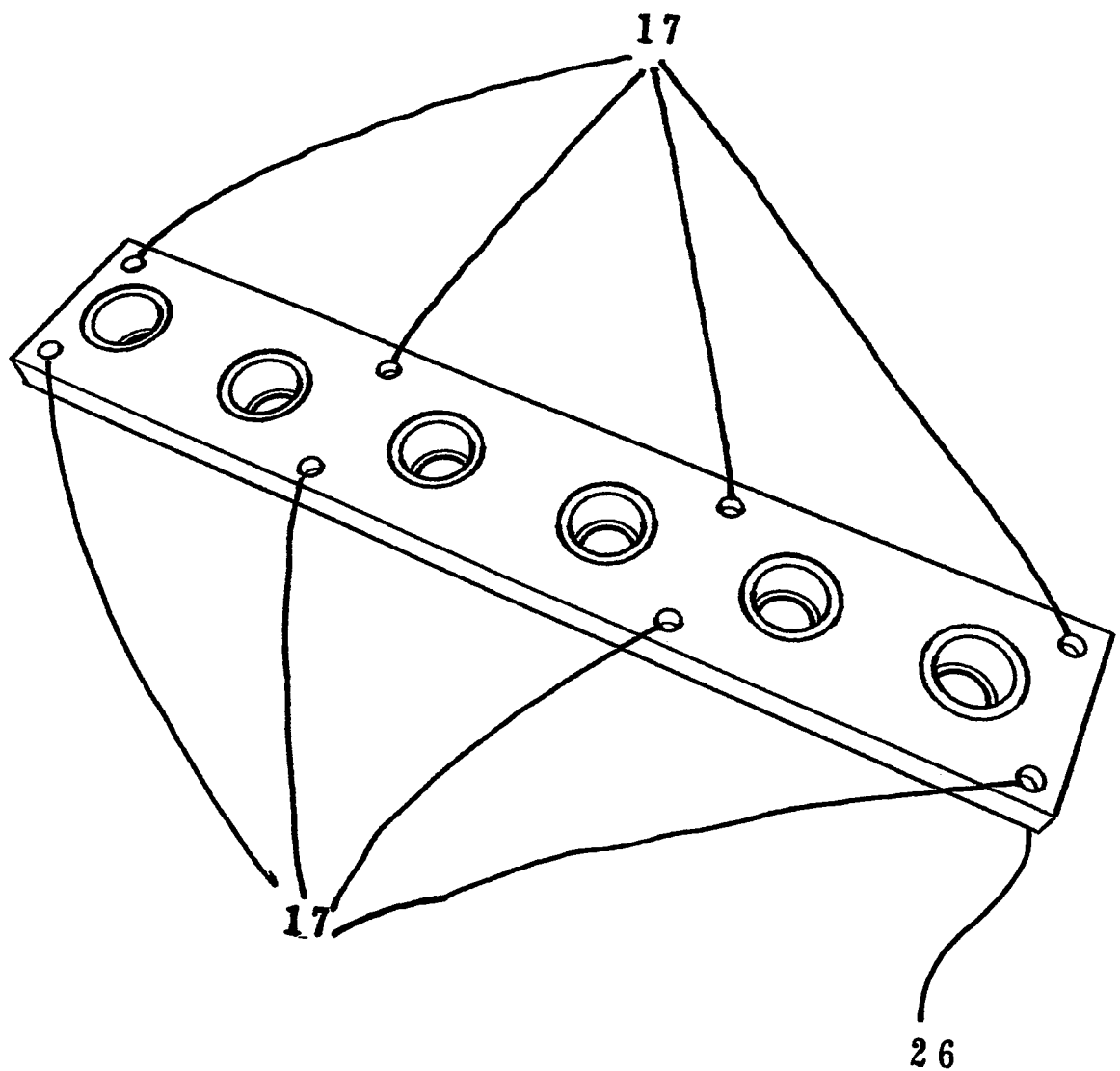
FIG. 10 Shows a recessed push button back plate (26) with mounting holes on back plate (17) for using mounting screw or rivet for mounting back plate (18) screws or rivets are not shown in the figures.
Figure 11:
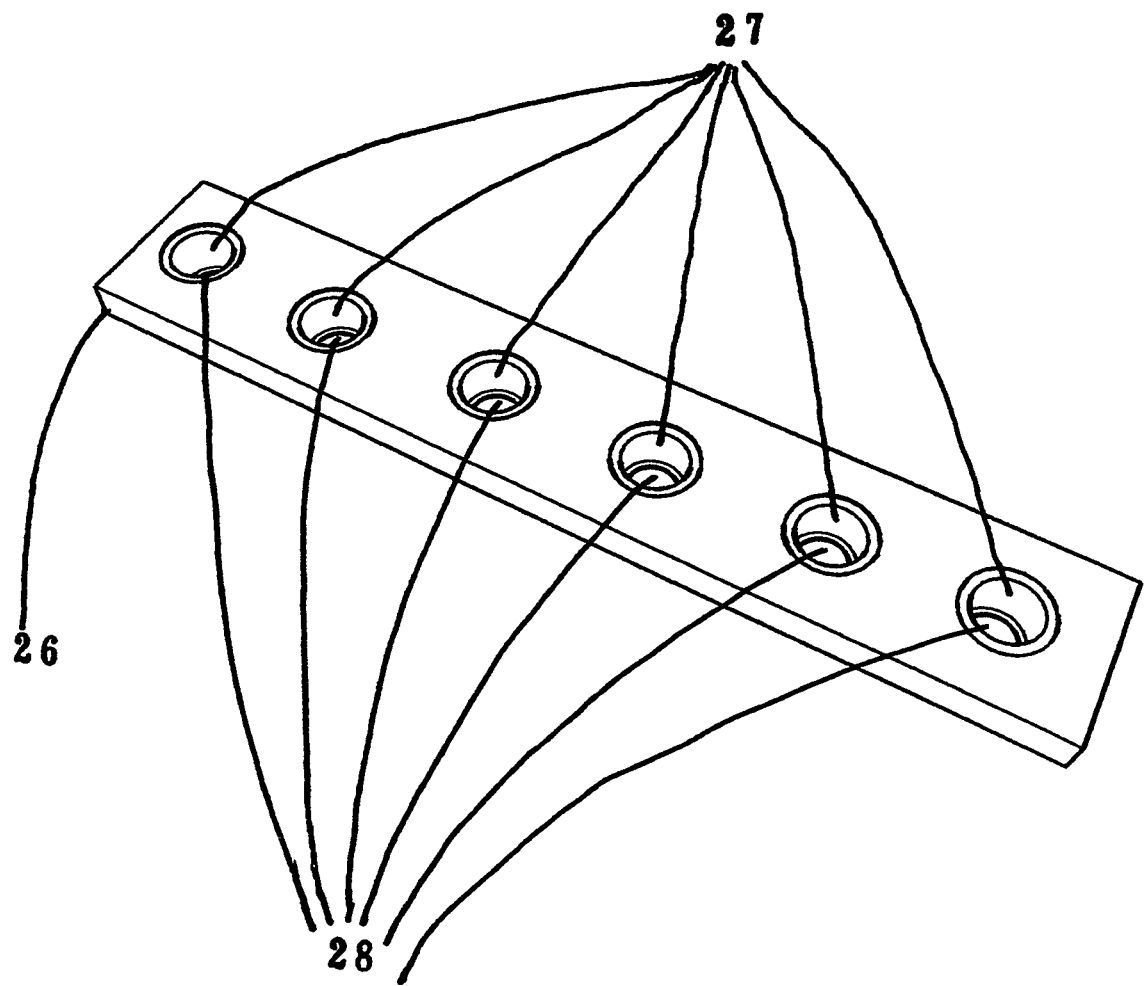
FIG. 11 Shows a recessed push button back plate (26) that has the recessed push button cutout (27) openings along with the recessed push button thru hole (28) which allows for the push button end of push rod (10) to enter into the recessed push button cutout area (27) allowing the recessed push button thru hole (28) to be sized the same or slightly smaller than the recessed push button cutout (27) opening, creating a small guide lip entrance edge opening to the recessed push button cutout (27) opening from the recessed push button thru hole (28) so as the push button end of push rod (10) is in the recessed push button cutout (27) it has some space all around it allowing for ease of operation and to not being so tight in the recessed push button cutout (27) opening while the reduced size of the recessed push button thru hole (28) is guiding the push button end of push rod (10) that is sized a little bit smaller than the recessed push button cutout space (27) opening allowing for easier movement operation of the push button end of push rod (10) that is located in the recessed push button cutout (27) after the push button end of push rod (10) has traveled thru the recessed push button thru hole (28) with as much or as little of a gap to the opening lip space of the recessed push button thru hole (28) as desired where the recessed push button cutout (27) meets the recessed push button thru hole (28) so the push button end of push rod (10) has a guide hole to the recessed push button cutout (27) no matter what size opening hole is chosen for the recessed push button thru hole (28) to have as it meets the recessed push button cutout (27) opening space the size is a manufacturer preference only as the stop lip on push rod (12) will keep the push button end of push rod (10) from falling out of the recessed push button thru hole (28) and the recessed push button cutout (27) space in the recessed push button back plate (26) the push button end of push rod (10) will be in a predetermined designated place ready to be pressed in at the recessed push button cutout (27) allowing sockets to be held or released from the main socket holder body (1).
Figure 12:
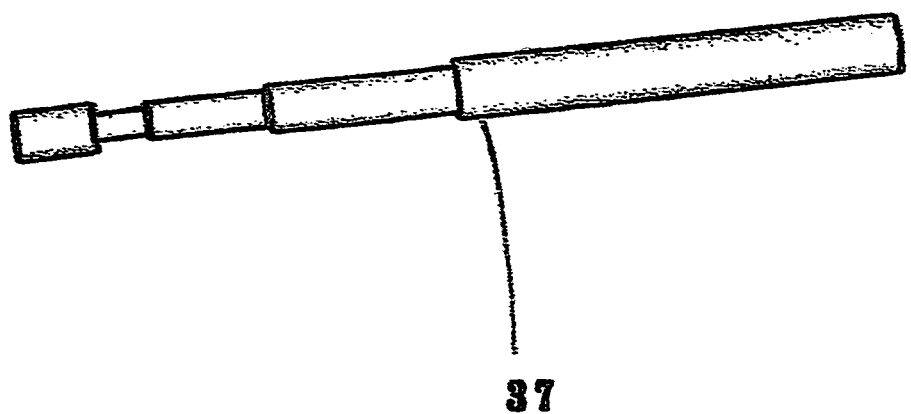
FIG. 12 Shows a telescoping magnetic pickup tool (37).
Figure 13:
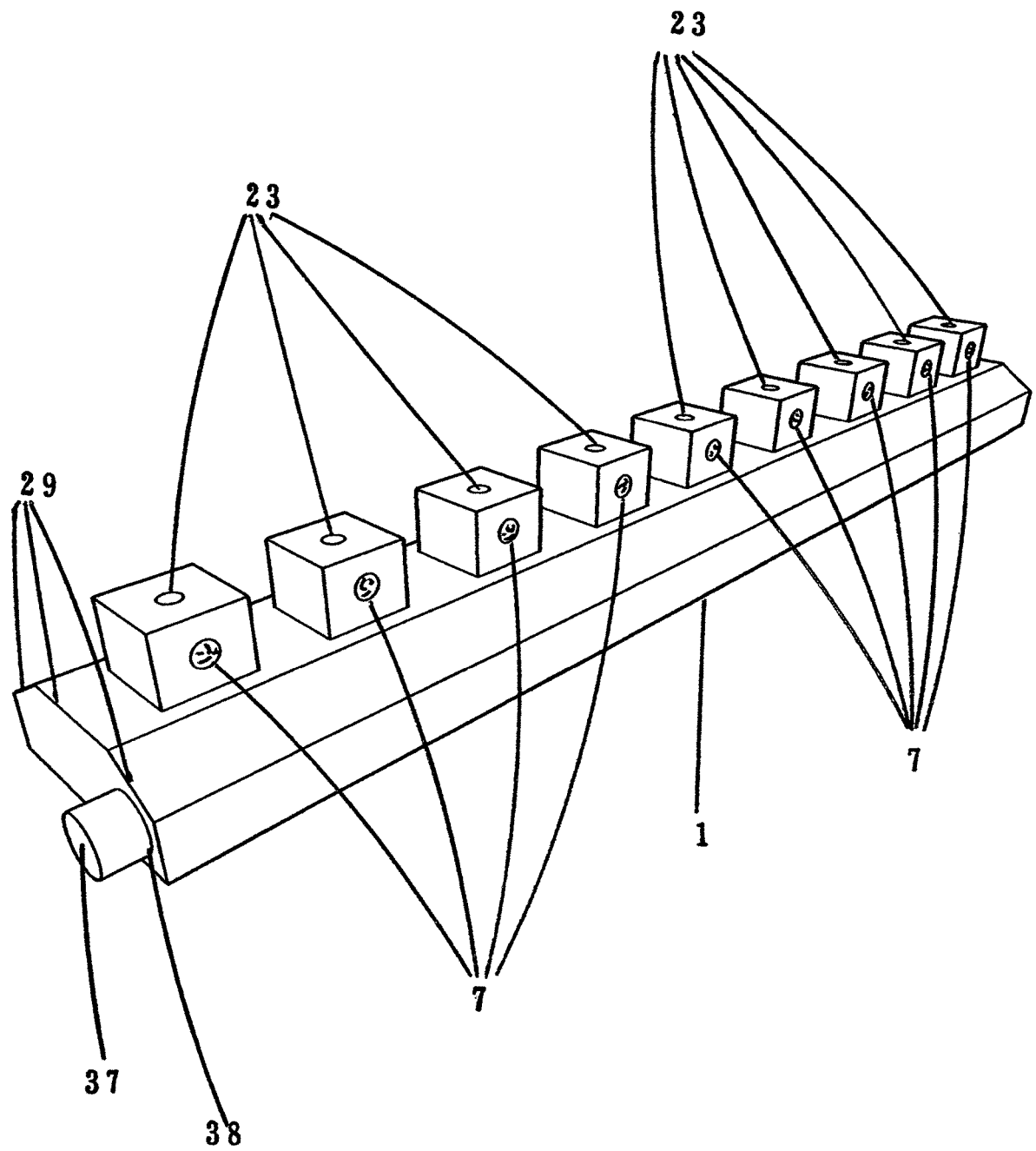
FIG. 13 Shows a main socket holder body (1) with push rod relief holes (23) along with socket locking ball (7) and a plurality of angles on main socket holder body (29) including a telescoping magnetic pickup tool (37) with a telescoping magnetic pickup tool mounting hole (38).
Figure 14:
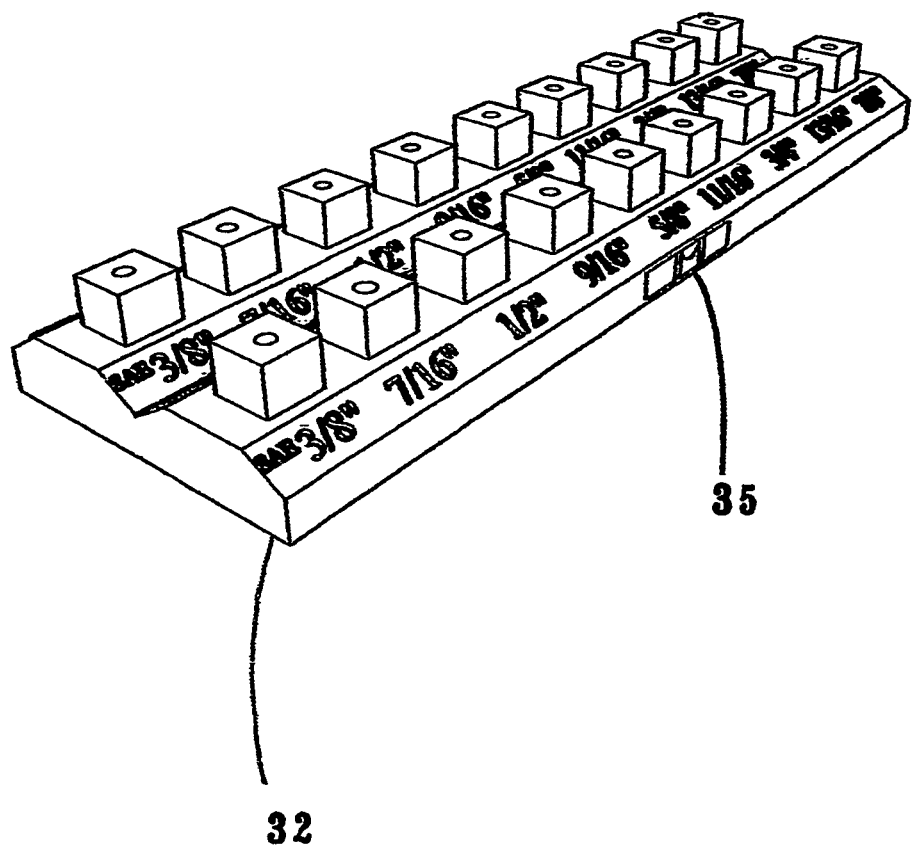
FIG. 14 Shows a multiple column socket holder mounting body (32) which also has a bubble level (35) built into it.

PARTS LIST 1. main socket holder
2. socket holder mountings
3. socket locking ball hole
4. cutout on main body for mounting exposed or recessed back plate
5. push rod guide hole
6. stop lip cutout on main body
7. socket locking ball
8. crimp
9. push rod rounded internal end
10. push button end of push rod
11. push rod type 3
12. stop lip on push rod
13. internal locking ball
14. individual socket holder push spring
15. exposed button back plate
16. back plate hole
17. mounting holes on back plate
18. mounting screw or rivet for mounting back plate
19. socket locking ball notch
20. push rod spring lip
21. main body cutout for push rod spring stopping
22. push rod spring mounted on push rod
23. push rod relief hole
24. push rod external end
25. socket holder mounting with push rod relief hole
26. recessed push button back plate
27. recessed push button cutout
28. recessed push button thru hole
29. plurality of angles on main socket holder body
30. socket size markings of sae or metric
31. screw or rivet hole in main socket holder body to mount back plate
32. multiple column socket holder mounting body
33. handle
34. handle mounting holes on main socket holder body
35. bubble level
36. measurement scale with rulings in inches and metric
37. telescoping magnetic pickup tool
38. telescoping magnetic pickup tool mounting hole
39. push rod internal end
40. push rod type 1
41. push rod type 2

DETAILED DESCRIPTION OF THE INVENTION

The detailed description of the tool socket holder named as the Socket-Lock-It holder. Has a main socket holder body (1) which has a plurality of individual socket holder mountings (2) that hold sockets on them with a push button controllable socket locking ball (7) which is allowed to partially move in and out of the individual socket holder mounting (2) in a socket locking ball hole (3) without falling out of the socket locking ball hole (3) by placement of a crimp (8) placed on the outside edge of the socket locking ball hole (3).

This socket locking ball hole (3) intersects with an internal push rod guide hole (5) that can be made to house and use any one of three different types of push rods, such as push rod type 1 (40) has an internal locking ball (13) that meets a push rod rounded internal end (9) that creates a small needed space for socket locking ball (7) to partially move into the push rod guide hole (5) when aligned with socket locking ball hole (3), or push rod type 2 (41) and push rod type 3 (11) have a socket locking ball notch (19) made onto them that creates needed internal space in the push rod guide hole (5) so that when aligned up with the socket locking ball hole (3) the socket locking ball (7) in the socket locking ball hole (3) can partially drop into the push rod guide hole (5) allowing for sockets to be placed on or taken off of the socket holder mounting (2) by pressing the push button end of the push rod (10) located at the exposed button back plate (15) or the recessed push button back plate (26) mounted on the back side of the main socket holder body (1).

When any of the three push rod types are pressed with the push button end of push rod (10) there is a stop lip cutout in the main body (6) where the stop lip on push rod (12) can move into allowing for inward movement of any of the three types of push rods, while also allowing for outward movement of any of the push rod types, where their movement will be stopped, at the back plate hole (16) on either the exposed button back plate (15) or recessed push button back plate (26).

Push rod type 3 (11) has a push rod relief hole (23) in the end of socket holder mounting (2) that lets the push rod external end (24) protrude thru the socket holder mounting as it is being pressed from the push button end of push rod (10) during usage.

The main socket holder body (1) can have a handle (33) being mounted with handle mounting holes on main socket holder body (34) along with a plurality of angles on main socket holder body (29) that can have socket size markings of sae or metric (30) placed next to the individual socket holder mounting (2) allowing for precise placement of these sockets back to the main socket holder body (1) after being removed from the main socket holder body (1) also on these plurality of angles on the main socket holder body (29) can be placed on either or both sides a measurement ruler scale in inches and metric (36).

The main socket holder body (1) can also have a bubble level (35) placed on the main socket holder body (35) along with having a telescoping magnetic pickup holder (37) with a mounting hole of telescoping magnetic pick up tool (38) on the main socket holder body (1).

The main socket holder body (1) can have mounting holes on back plate (17) along with screw holes in main socket holder body to mount back plate (31) and mounting screws for mounting back plate (18) or rivets for installation purposes along with any adhesive resins desired.

Also the main socket holder body (1) can be made alternatively as a multiple column socket holder mounting body (32) allowing for multiple columns of socket holder mountings (2) also having various size socket drives on each column if needed and different sizes on different columns as in example ¼", ⅜", ½", ¾", 1", drives.

Columns of sockets can be of any length desired as also can be said about the main socket holder body (1) to be any length desired.

The cutout on main body for mounting exposed or recessed back plate (4) can be as shallow or deep as desired, allowing the push button end of push rod (10) to be recessed even more if so desired allowing for even more protection from accidental presses of the push button end of push rod (10)

All parts working together to allow for easy mount and dismount of sockets to the main socket holder body (1) while holding sockets mounted to socket holder mountings (2) strong and secure.

The invention claimed is:

1. An apparatus for holding and releasing took having a socket drive connection fitting, the apparatus comprising: a main socket holder body (1) with plurality of a socket holder mountings (2) each having a socket locking ball hole (3), a socket locking ball (7), a crimp (8), a push rod guide hole (5), an individual socket holder push spring (1.4), and an internal locking ball (13), a plurality of push rods (40) each individually within one of the socket holder mountings (2), each push rod (40) including a stop lip (12) along with also having one end serving as a push button end (10) of the push rod (40) and another end as a push rod rounded internal end (9) that goes first into the main socket holder body (1) when installing the push rod (40) into the main socket holder body (1), with the push rod guide hole (5) opening at a back of the main socket holder body (1), the body (1) including a plurality of stop lip cutouts (6) each aligned with a respective one of the guide holes (5) allowing for inward movement of the stop lip (12) on the push rod (40), an exposed button back plate (15) with a plurality of back plate holes (16) each aligned with a respective one of the stop lip cutouts (6), each back plate hole (16) is configured to let the respective push button end (10) of the push rod (40) go thru while not allowing the stop lip (12) on the push rod (40) to go thru thus stopping outward movement of the push rod (40), with the exposed button back plate (15) configured to be mounted on the main socket holder body (1) after all of the push rods (40) have been installed on the main socket holder body (1) allowing for controlled use of the push button end (10) of each of the push rods (40) when pressed or released at the respective back plate hole (16), each of the push rods (40) being located in the respective guide hole (5) such that the rounded internal end (9) of the push rod (40) is configured to move inward against the internal locking ball (13) which was previously holding the socket locking ball (7) in place in the socket locking ball hole (3), whereby pushing of the push button end (10) of push rod (40) moves the internal end (9) against the internal locking ball (13) which allows for the socket locking ball (7) to partially drop into the push rod guide hole (5) allowing for the tools having the socket drive connection fitting to be placed on or taken off of the respective socket holder mounting (2), pushing of the push button end (9) of the push rod (40) against the internal locking ball (13) is also configured to push the internal locking ball (13) against the individual socket holder push spring (14) which compresses allowing for movement of the push rod (40) to go into the push rod guide hole (5) while also creating needed pressure force on the socket holder push spring (14) which is configured to move the push rod (40) and the internal locking ball (13) along with realigning the internal locking ball (13) with and lifting the socket locking ball (7) back up into the socket locking ball hole (3) where it will rest against the crimp (8) which is placed on outer edge of the socket locking ball hole (3) when the push button end (10) of the push rod (40) is released, individual ones of the socket holder mountings (2) and the respective push rods (40) thus creating desired result of holding and releasing of the tools having the socket drive connection fitting on the main socket holder body (1).

2. The apparatus of claim 1, wherein each back plate hole (16) of said back plate (26) is a recessed push button cutout (27) which is placed over and in alignment with a recessed push button thru hole (28) which allows for the push button end (10) of push rod (10) to go into the recessed push button back plate (26) when not pressed to be in a protected and usable position on the back plate (26) thus protecting the push button end of push rod (10) from releasing accidental usage presses at the push button end (10) of push rod (40) while still allowing for controlled use of the push button end (10) of push rod (40), where the push button end (10) of push rod (40) is allowed to enter the recessed push button cutout (27) thru the recessed push button thru hole (28) which is configured to be sized the same size as the recessed push button cutout (27) or slightly smaller than the recessed push button cutout (27) allowing the push button end (10) of push rod (40) to be in the recessed push button cutout (27) while also allowing for some clearance room from a recessed push button cutout (27) interior side wall allowing for less or even no contact of the push button end (10) of the push rod (40) with the recessed push button cutout (27) interior side wall, the recessed push button cutout (27) which is also sized so the stop lip (12) on push rod (40) cannot enter the recessed push button thru hole (28) thus stopping outward movement there of the push button end (1.0) of the push rod (40), by the back plate (26) against the recessed push button thru hole (28).

3. The apparatus of claim 1, wherein said main socket holder body (1) has a cutout on the body (1) for mounting the back plate (15), the cutout is configured to be one of a shallow cutout or a deep cutout into said body (1) allowing for space for the push button end (10) of the push rod (40), whether the back plate (15) is one of exposed or recessed on the body (1) in the cutout on the body (1) for mounting the push rods (4).

4. The apparatus of claim 1, wherein said main socket holder body (1) has a plurality of mounting screws or rivets for mounting the back plate (15) to the main socket holder body (1) along with having a plurality of mounting holes on the back plate (15) and the main socket holder body (1).

5. The apparatus of claim 1, wherein said main socket holder body (1) has a plurality of angles (29) on said body (1).

6. The apparatus of claim 5, wherein said body (1) has socket size markings of sae or metric (30) on the plurality of angles (9) on said body (1).

7. The apparatus of claim 5, wherein said body (1) has a measurement scale with rulings in inches and metric (36) on the angles (29) on said body (1).

8. The apparatus of claim 1, wherein said socket holder mountings (2) of said body (1) is configured as multiple columns of said socket holder mountings (2).

9. The apparatus of claim 1, wherein said body (1) has a handle (33) with handle mounting holes on said body (1) to hold the handle (33) onto the body (1).

10. The apparatus of claim 1, wherein said body (1) has a bubble level (35) built into the body (1).

11. The apparatus of claim 1, wherein said body (1) has a telescoping magnetic pickup tool (37) along with a telescoping magnetic pickup tool mounting hole (38).

12. An apparatus for holding and releasing tools having a socket drive connection fitting, the apparatus comprising: a main socket holder body (1) with plurality of a socket holder mountings (2), each socket holder mounting (2) including a socket locking ball hole (3), a push rod guide hole (5), a socket locking ball (7), and an individual socket holder push spring (14), a plurality of push rods (41) each individually mounted within one of the socket holder mountings (2), each push rod (41) including a socket locking ball notch (19), a stop lip (12), a push button end (10), and a push rod internal end (39), the body (1) including a plurality of stop lip cutouts (6) each aligned with a respective one of the guide holes (5) that each allow for inward movement of the stop hp (12) on a respective one of the push rods (41), an exposed button back plate (15) with a plurality of back plate holes (16) each aligned with a respective one of the stop lip cutouts (6) that are each configured to let the push button end (10) of a respective one of the push rods (41) go thru while not allowing the stop lip (12) on push rod (41) to go thru thus stopping outward movement of the push rod (41) by the exposed button back plate (15) which is mounted on the main socket holder body (1), whereby when the push button end (10) of push rod (41) is pressed the push rod internal end (39) moves inward compressing against the respective socket holder push spring (14) which allows for movement of the push rod (41) which had been positioned previously to hold the socket locking ball (7) in an upward outer position place in the socket locking ball hole (3) because the socket locking ball notch (19) on the push rod (41) in the push rod guide hole (5) was not in an alignment position with the socket locking ball hole (3), where the socket locking ball notch (19) needs to be aligned with the socket locking ball hole (3) to allow the socket locking ball (7) to enter partially into the push rod guide hole (5), whereas when pressing the push button end (10) of the push rod (41) moves the push rod (41) with the socket locking ball notch (19) in the push rod guide hole (5) to the alignment position so the socket locking ball hole (3) with the socket locking ball (7) aligns with the socket locking ball notch (19) on the push rod (41) allowing the socket locking ball (7) to partially drop into the push rod guide hole (5) allowing for the tools having the socket drive connection fitting to be placed on or off of the individual socket holder mountings (2), inward movement of the push rod (41) is configured to compress the respective socket holder push spring (14) while also creating needed pressure force on the socket holder push spring (14) that is configured to be used to move the push rod (41) back into an original position where the socket locking ball notch (19) on the push rod (41) is not in alignment with the socket locking ball hole (3), the pressure force of the socket holder push spring (14) is configured to lift the socket locking ball (7) back up into the socket locking ball hole (3) as the socket locking ball notch (19) is moving away from the alignment position and is configured to lift the socket locking ball (7) outward until the socket locking ball (7) is stopped by the crimp (8) which is placed on outer edge of the socket locking ball hole (3), thereby the apparatus creating desired results of holding and releasing the tools having the socket drive connection fitting on the socket holder mountings (2).

13. The apparatus of claim 12, wherein each back plate hole (16) of said back plate (26) is a recessed push button cutout (27) which is placed over and in alignment with a recessed push button thru hole (28) which allows for the push button end (10) of push rod (10) to go into the recessed push button back plate (26) when not pressed to be in a protected and usable position on the back plate (26) thus protecting the push button end of push rod (10) from releasing accidental usage presses at the push button end (10) of push rod (40) while still allowing for controlled use of the push button end (10) of push rod (40), where the push button end (10) of push rod (40) is allowed to enter the recessed push button cutout (27) thru the recessed push button thru hole (28) which is configured to be sized the same size as the recessed push button cutout (27) or slightly smaller than the recessed push button cutout (27) allowing the push button end (10) of push rod (40) to be in the recessed push button cutout (27) while also allowing for some clearance room from a recessed push button cutout (27) interior side wall allowing, for less or even no contact of the push button end (10) of the push rod (40) with the recessed push button cutout (27) interior side wall, the recessed push button cutout (27) which is also sized so the stop lip (12) on push rod (40) cannot enter the recessed push button thru hole (28) thus stopping outward movement there of the push button end (10) of the push rod (40), by the back plate (26) against the recessed push button thru hole (28).

14. The apparatus of claim 12, wherein said main socket holder body (1) has a cutout on the body (1) for mounting the back plate (15), the cutout is configured to be one of a shallow cutout or a deep cutout into said body (1) allowing for space for the push button end (10) of the push rod (40), whether the back plate (15) is one of exposed or recessed on the body (1) in the cutout on the body (1) for mounting the push rods (4).

15. The apparatus of claim 12, wherein said main socket holder body (1) has a plurality of mounting screws or rivets for mounting the back plate (15) to the main socket holder body (1) along with having a plurality of mounting holes on the back plate (15) and the main socket holder body (1).

16. The apparatus of claim 12, wherein said main socket holder body (1) has a plurality of angles (29) on said body (1).

17. The apparatus of claim 16, wherein said body (1) has socket size markings of sae or metric (30) on the plurality of angles (29) on said body (1).

18. The apparatus of claim 16, wherein said body (1) has a measurement scale with rulings in inches and metric (36) on the angles (29) on said body (1).

19. The apparatus of claim 12, wherein said socket holder mountings (2) of said body (1) is configured as multiple columns of said socket holder mountings (2).

20. The apparatus of claim 12, wherein said body (1) has a handle (33) with handle mounting holes on said body (1) to hold the handle (33) onto the body (1).

21. The apparatus of claim 12, wherein said body (1) has a bubble level (35) built into the body (1).

22. The apparatus of claim 12, wherein said body (1) has a telescoping magnetic pickup tool (37) along with a telescoping magnetic pickup tool mounting hole (38).

23. An apparatus for holding and releasing tools having a socket drive connection fitting, the apparatus comprising: a main socket holder body (1) with plurality of a socket holder mountings (2) each with a push rod relief hole (23), a socket locking ball hole (3), a push rod guide hole (5), a socket locking ball (7), a crimp (8) on outer edge of the socket locking ball hole (3) that serves to keep the socket locking ball (7) from falling out of the socket locking ball hole (3), and a push rod spring (22) mounted on a main body cutout for a push rod stop (21), a plurality of push rods (11) each having a socket locking ball notch (19), a stop lip (12), a push button end (10), a push rod external end (24), and a push rod spring lip (20), a plurality of stop lip cutouts (6) on the body (1) each aligned with a respective one of the guide holes (5) whereby each of the stop lip cutouts (6) is configured to allow for inward movement of a respective one of the stop lips (12) on the push rod (11), an exposed button back plate (15) with a plurality of back plate holes (16), wherein each of the holes (16) is configured to let a respective one of the push button ends (10) of the push rod (11) go thru while not allowing the stop lip (12) on the push rod (11) to go thru thus stopping outward movement of the push rod (11) by the exposed button back plate (15) which is mounted on the main socket holder body (1), wherein when the push button end (10) of push rod (11) is pressed the push rod (11) goes into the push rod guide hole (5), where the push rod (11) having the push rod spring lip (20) which is holding the push rod spring (22) in place on the push rod (11) so the push rod (11) is configured to move into the push rod guide hole (5) while holding the push rod spring (22) so the push rod spring (22) is compressed in between the main body cutout (21) and the push rod spring lip (20) while also allowing the socket locking ball notch (19) on the push rod (11) to move internally into place where the socket locking ball notch (19) is moved into an alignment position with the socket locking ball hole (3) allowing for the socket locking ball (7) to partially drop into the push rod guide hole (5) into space created by the socket locking ball notch (19) allowing for the tools having the socket drive connection fitting to be placed on or off of the socket holder mountings (2) while the push rod external end (24) is allowed to go thru the push rod relief hole (23) which is on the outer end of the socket holder mounting (2), whereby as the push button end (10) of push rod (11) is pressed the push rod spring (22) compresses which is configured to upon stopping of the pressing of the push button end (10) of the push rod (11), move the push rod (11) away from the alignment position with the socket locking ball hole (3) aligned with the socket locking ball notch (19), thereby lifting the socket locking ball (7) into the socket locking ball hole (3) to a designated stopping point determined by the crimp (8) on the outer edge of the socket locking ball hole (3), the apparatus creating desired results of hold or release action to the tools having the socket drive connection fitting being held on the socket holder mountings (2) by moving the socket locking ball (7) in and out of the socket locking ball hole (3) between the crimp (8) and the push rod (11) as the socket locking ball notch (19) of the push rod (11) moves in and out of alignment with the socket locking ball hole (3) creating strong socket hold or release action on the socket holder mountings (2).

24. The apparatus of claim 23, wherein each back plate hole (16) of said back plate (26) is a recessed push button cutout (27) which is placed over and in alignment with a recessed push button thru hole (28) which allows for the push button end (10) of push rod (10) to go into the recessed push button back plate (26) when not pressed to be in a protected and usable position on the back plate (26) thus protecting the push button end of push rod (10) from releasing accidental usage presses at the push button end (10) of push rod (40) while still allowing for controlled use of the push button end (10) of push rod (40), where the push button end (10) of push rod (40) is allowed to enter the recessed push button cutout (27) thru the recessed push button thru hole (28) which is configured to be sized the same size as the recessed push button cutout (27) or slightly smaller than the recessed push button cutout (27) allowing the push button end (10) of push rod (40) to be in the recessed push button cutout (27) while also allowing for some clearance room from a recessed push button cutout (27) interior side wall allowing for less or even no contact of the push button end (10) of the push rod (40) with the recessed push button cutout (27) interior side wall, the recessed push button cutout (27) which is also sized so the stop lip (12) on push rod (40) cannot enter the recessed push button thru hole (28) thus stopping outward movement there of the push button end (10) of the push rod (40), by the back plate (26) against the recessed push button thru hole (28).

25. The apparatus of claim 23, wherein said main socket holder body (1) has a cutout on the body (1) for mounting the back plate (15), the cutout is configured to be one of a shallow cutout or a deep cutout into said body (1) allowing for space for the push button end (10) of the push rod (40), whether the back plate (15) is one of exposed or recessed on the body (1) in the cutout on the body (1) for mounting the push rods (4).

26. The apparatus of claim 23, wherein said main socket holder body (1) has a plurality of mounting screws or rivets for mounting the back plate (15) to the main socket holder body (1) along with having a plurality of mounting holes on the back plate (15) and the main socket holder body (1).

27. The apparatus of claim 23, wherein said main socket holder body (1) has a plurality of angles (29) on said body (1).

28. The apparatus of claim 27, wherein said body (1) has socket size markings of sae or metric (30) on the plurality of angles (29) on said body (1).

29. The apparatus of claim 27, wherein said body (1) has a measurement scale with rulings in inches and metric (36) on the angles (29) on said body (1).

30. The apparatus of claim 23, wherein said socket holder mountings (2) of said body (1) is configured as multiple columns of said socket holder mountings (2).

31. The apparatus of claim 23, wherein said body (1) has a handle (33) with handle mounting holes on said body (1) to hold the handle (33) onto the body (1).

32. The apparatus of claim 23, wherein said body (1) has a bubble level (35) built into the body (1).

33. The apparatus of claim 23, wherein said body (1) has a telescoping magnetic pickup tool (37) along with a telescoping magnetic pickup tool mounting hole (38).

\* \* \* \* \*